US010656303B2

(12) United States Patent
Columbri

(10) Patent No.: US 10,656,303 B2
(45) Date of Patent: May 19, 2020

(54) SYSTEM AND METHOD FOR SCREENING OBJECTS

(71) Applicant: Vanderlande Industries B.V., Veghel (NL)

(72) Inventor: Luis Hausmann Columbri, Santpedor (ES)

(73) Assignee: Vanderlande Industries B.V., Veghel (NL)

(*) Notice: Subject to any disclaimer, the term of this patent is extended or adjusted under 35 U.S.C. 154(b) by 0 days.

(21) Appl. No.: 16/091,609

(22) PCT Filed: Apr. 5, 2017

(86) PCT No.: PCT/NL2017/050215
§ 371 (c)(1),
(2) Date: Oct. 5, 2018

(87) PCT Pub. No.: WO2017/176117
PCT Pub. Date: Oct. 12, 2017

(65) Prior Publication Data
US 2019/0120996 A1 Apr. 25, 2019

(30) Foreign Application Priority Data
Apr. 8, 2016 (EP) ..................... 16382157

(51) Int. Cl.
*G06F 7/00* (2006.01)
*G01V 5/00* (2006.01)

(52) U.S. Cl.
CPC .......... *G01V 5/0016* (2013.01); *G01V 5/0008* (2013.01)

(58) Field of Classification Search
None
See application file for complete search history.

(56) References Cited

U.S. PATENT DOCUMENTS

| 7,913,515 B2* | 3/2011 | Nuiding ................... F25B 5/00 62/198 |
| 9,268,054 B2* | 2/2016 | Osann, Jr. ............ G01V 5/0008 |
| 2013/0009747 A1 | 1/2013 | Osann, Jr. |

FOREIGN PATENT DOCUMENTS

| WO | 20120122148 A2 | 9/2012 |
| WO | 2013/025412 A2 | 2/2013 |
| WO | 2015/050440 A1 | 4/2015 |

OTHER PUBLICATIONS

International Search Report and Written Opinion of corresponding International Application No. PCT/NL2017/050215; 10 pages; dated Jun. 7, 2017.

* cited by examiner

*Primary Examiner* — Yolanda R Cumbess
(74) *Attorney, Agent, or Firm* — Shumaker, Loop & Kendrick, LLP

(57) ABSTRACT

System and method for screening objects of an individual, comprising an infeed station, object containers, an outfeed station, a screening station for automated screening of object containers from the infeed station and a conveyor for conveying object containers from the infeed station to the outfeed station via the screening station. The infeed station comprises an identification terminal for determining an identification of the individual, an object container dispenser for making an object container available to the individual, and a detection device for detecting the individual at the infeed station, wherein the object container dispenser is configured to make object containers available to the individual during use of the system only when said individual's identification has been determined and as long as the detection device continues to detect the presence of said individual at the infeed station.

14 Claims, 3 Drawing Sheets

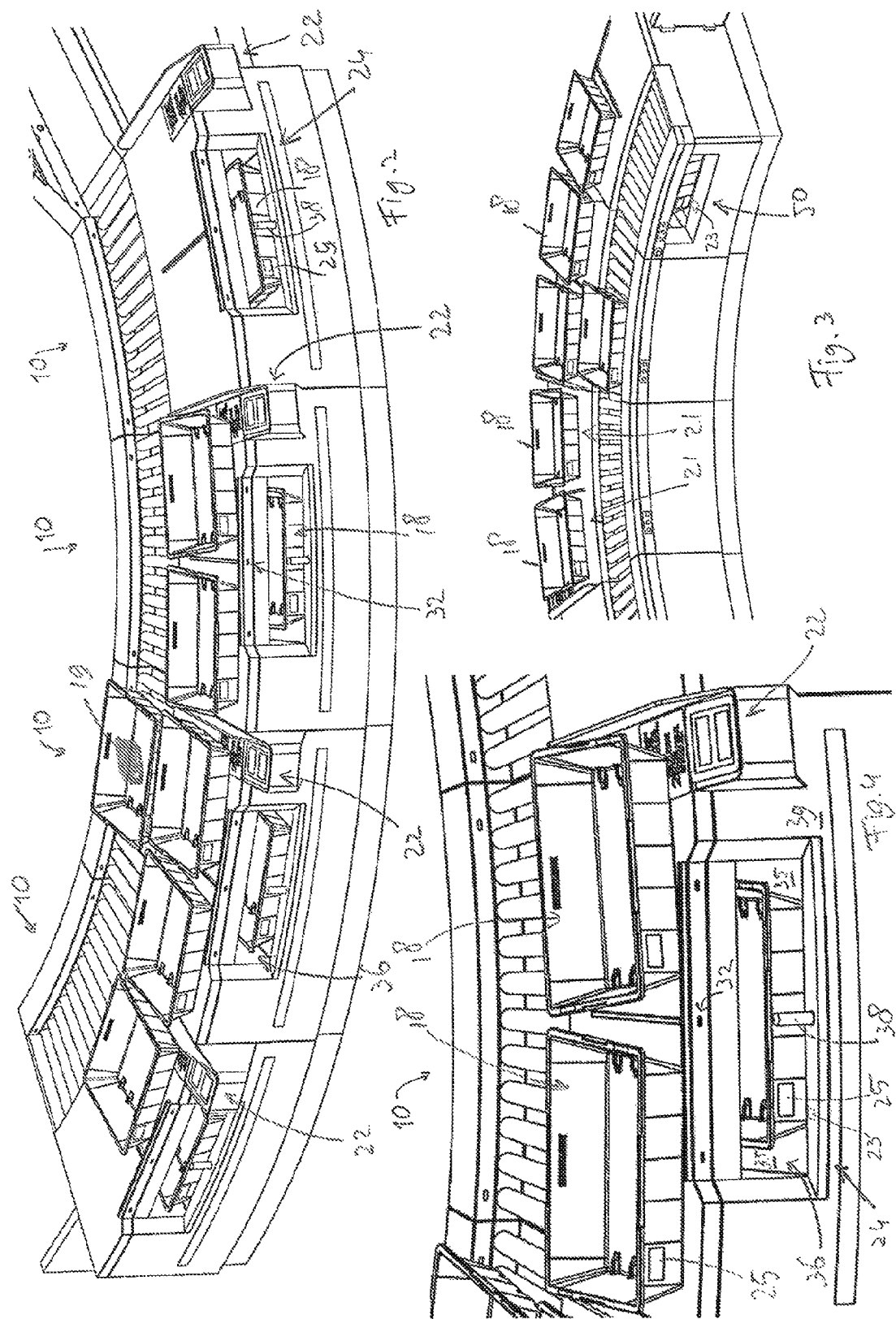

SYSTEM AND METHOD FOR SCREENING OBJECTS

CROSS-REFERENCE TO RELATED APPLICATIONS AND PRIORITY

The present application claims priority from International Application No. PCT/NL2017/050215, filed on Apr. 5, 2017 which claims the priority to European Patent Application No. 16382157.3 filed on Apr. 8, 2016, both of which are hereby expressly incorporated by reference in the entirety.

The invention relates to a system and a method for screening objects. The invention in particular relates to the screening of objects such as hand-luggage, among which personal effects such as purses, coats and the like of individuals, such as passengers at an airport. It is also conceivable to use the invention at other secured locations such as businesses, law courts and other public buildings.

WO 2012/122148 A2 discloses an automated screening system, for example for use at airports.

It is an object of the invention to further increase the user-friendliness of such a system.

The above object is achieved with the system according to the present invention for screening objects such as hand-luggage of an individual such as an air passenger, comprising an infeed station, a multitude of object containers, an outfeed station, a screening station for automated screening of object containers from the infeed station, a conveyor designed for conveying object containers, i.e. of the multitude of object containers, from the infeed station to the outfeed station via the screening station in use, wherein the infeed station comprises an identification terminal for determining an identification of the individual, and an object container dispenser for making an object container, i.e. from the multitude of object containers, available to the individual for placement of an object in the object container, wherein the infeed station further comprises a detection device for detecting the individual at the infeed station, wherein the object container dispenser is configured to make object containers available to the individual during use of the system only when said individual's identification has been determined using the identification terminal and as long as the detection device continues to detect said individual at the infeed station.

An effect of said infeed station provided with the detection device of the system according to the invention is that an individual, such as a passenger at an airport, only needs to have his identification determined once, even if he should need more than one object container. As long as said individual remains present at the infeed station, he can keep taking containers, which thus makes it possible to link said one or more containers to, for example, the individual's identification in the system. In the above-described prior art screening system, an individual must have his identification document scanned anew each time he wishes to obtain a next container, which can be regarded as not user-friendly. Moreover, with the system according to the invention problems are prevented such as may occur if the individual places his identification document, such as a boarding pass in the case of an air passenger, in the first object container, for example together with his keys and purse, which situation is quite conceivable. With the above-described known screening system, said passenger cannot obtain a next container in that case, as he cannot have his identification document scanned anew, because it has already been introduced into the system in the first container.

The identification terminal may comprise a scanner for scanning an identification document, such as an individual's boarding pass or passport, for determining the individual's identification. Alternatively, or in combination with such a scanner, the identification terminal may comprise a fingerprint scanner or, for example, an iris scanner.

In one embodiment, the screening station comprises a scanning unit for generating an X-ray image of the individual's object placed in an object container for use in the screening process. In this way the object containers loaded with one or more objects arriving from the infeed station can be screened in a very effective and efficient manner within a short period of time. The images thus generated could subsequently be linked to the individual's identification as determined. Alternatively, said automated screening can take place by making use of a magnetic field, for example for metal detection, or of an air flow passing along the object or objects in a container, which air flow is analysed using a mass spectrometer, for example for screening for organic material.

It is advantageous if each one of the multitude of object containers has a readable container identification, in which case the system is provided with a reading device for reading the container identification and a processing device that is operatively connected to the reading device and the identification terminal for automatically linking the container identification of an object container made available to the individual to that individual's identification. In this way it is known to which individual objects present in a specific object container belong. This makes it possible, for example, to trace an individual who has forgotten to remove his objects from a container again after screening thereof. In addition to that, this excludes the possibility of a discussion arising regarding which objects in an object container belong to which individual, which, depending on the specific use of the system, is for example advantageous if it should be determined upon screening that an object is prohibited. An example in this regard would be an object in the form of a knife in the case of use of the system for screening hand-luggage of departing passengers at an airport. If the aforesaid scanning unit is used, the generated image of the object can moreover be linked to the container identification of said object container, and the image can also be linked to the identification as determined of the associated individual, in this case a passenger. Linking a passenger's identification to the container identification furthermore makes it possible to recognise object containers of passengers of particular flights and automatically directing said containers to a side track of the system for manual screening by an operator, for example. The same applies if, for whatever reason, a particular passenger has been designated "suspect" in the processing device or in an external database that is operatively connected to the processing device. Furthermore, the system may be configured to have a passenger's object containers recognised on the basis of a manual input signal from an operator in the case of "suspicious" behaviour by said passenger at the infeed station and direct said object containers to a side track of the system, for example, for manual screening by an operator in addition to the screening by the scanning unit.

In one embodiment, the reading device is provided at the location of the object container dispenser so that the container identification can be read directly when an object container is made available. Alternatively or in combination therewith, a reading device may be provided at an upstream inlet of the screening station, so that the container identification of the object containers is read or reread just before automated screening thereof takes place.

The container identification is preferably in the form of a machine-readable unique identification code, such as a barcode, a QR (Quick Response) code or an RFID (Radio-frequency identification) element.

The object container dispenser preferably has an object container location for making an object container available to the individual at that location, as well as a blocking device which is movable between a blocking position and a releasing position, which blocking device, in use, blocks the making available of an object container to the individual at the object container location in the blocking position thereof and which releases the making available of an object container to the individual at the object container location in the releasing position thereof. In this way the object of only making object containers available to the passenger when the identification of the passenger has been determined and as long as the passenger is still present at the infeed station, is realised in an effective and is constructionally simple manner.

It is advantageous in that regard if the individual can gain access to the object container location via an opening with one of his hands, so that the individual can take the object container from the object container location via the opening by hand, wherein the blocking device, in the blocking position thereof, blocks the opening at least in part to passage of an object container through the opening. In this way the making available of object containers is released or blocked in an intuitive manner.

It is advantageous if the blocking device comprises an actuator and a lock pin that is movable by means of the actuator between its blocking position and the releasing position. The processing device is in that case configured to control the actuator, preferably by electric means. The actual may be a screw spindle, for example, or a pneumatically or hydraulically actuated piston-cylinder assembly.

The detection device preferably comprises a sensor which is configured for contactless detection of the individual in a predetermined detection area at the infeed station. In this way there is no physical interaction with the individual, which further increases the user-friendliness of the system according to the invention.

It is advantageous in that regard if the sensor is a presence sensor, preferably selected from the group consisting of a photo-electric sensor, a video camera sensor, a capacitive sensor, a passive infrared (PIR) sensor, a microwave sensor and an ultrasonic sensor.

The sensor is preferably provided in the immediate proximity of the opening, so that the presence of the individual can be detected in a reliable manner.

The conveyor preferably extends from the infeed station, via the screening station, to the outfeed station, and preferably it is a belt conveyor, a ball conveyor or a roller conveyor or a combination of such types.

In one embodiment, the outfeed station comprises a releasing location for releasing object containers arriving from the screening station to the individual. In a simple variant, this may be a part of the conveyor that is accessible to the individual. It is also conceivable for the outfeed station to comprise a further identification terminal for determining an identification of the individual, on the basis of which determined identification only object containers that belong to the individual will be released to the individual in question. In the case of object containers with a container identification, only containers linked to the individual's identification will be released, therefore.

According to a further aspect, the invention relates to a method for screening objects such as hand-luggage, using a system according to the invention as described above, said method comprising:

a) determining the individual's identification, using the identification terminal, b) detecting the individual at the infeed station, using the detection device, c) only making one or more object containers available to the individual by means of the object container dispenser when the individual's identification has been determined by means of the identification terminal and as long as the detection device continues to detect the individual at the infeed station.

Advantages of the method according to the invention are analogous to the above-described advantages of the system according to the invention.

The method preferably makes use of a system comprising an object container location and a blocking device as described above, wherein the blocking device only releases the making available of an object container to the individual during step c) when the individual's identification has been determined by means of the identification terminal and as long as the detection device continues to detect the individual at the infeed station.

In one embodiment of the system, in which each one of the multitude of object containers has a readable container identification and in which the system comprises a reading device and a processing device as described above, the method preferably comprises the additional steps of:

d) reading the container identification of an object container being made available to the individual, using the reading device, and e) linking said container identification to said individual's identification, using the processing device.

The present invention will be explained hereinafter by means of a description of preferred embodiments of systems and methods according to the invention, in which reference is made to the following figures, in which:

FIG. 2 is a more detailed three-dimensional view of a part of the system shown in FIG. 1;

FIG. 3 is a three-dimensional view of the part of the system shown in FIG. 2, shown from a rear side thereof;

FIG. 4 is an even more detailed view of a part of the system shown in FIG. 1;

Figure 1:
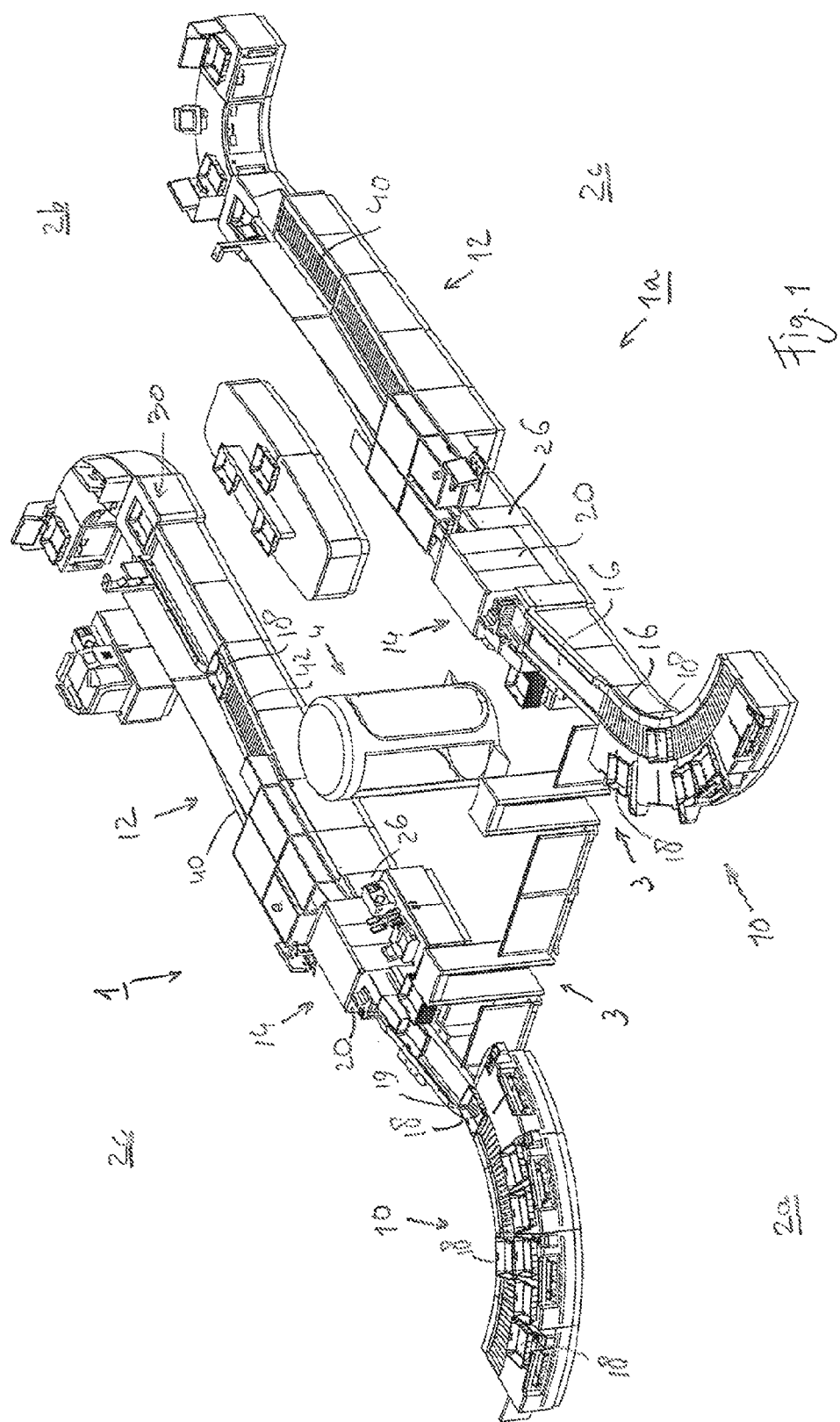
FIG. 1 is a three-dimensional view of a part of an airport in which two systems for screening objects according to the invention are provided.

Although systems according to the invention are used for various applications, the invention will be explained below with reference to an embodiment of a system according to the invention, i.e. a system 1 for screening hand-luggage of air passengers. The system 1 is for that purpose provided in a departures area 2a, 2b, 2c of an airport, in many cases together with several such systems. In FIG. 1 two systems 1 and 1a are shown by way of example, which systems are identical, albeit each others mirror image as regards their design. This configuration makes it possible to place screening systems for passengers between two such systems 1, 1a, in the present example to usual scanning gates 3 and a body scanner 4 for screening the passenger himself. In the departures area of the airport, zone 2a of the departures area is thus accessible to passengers that have not been screened (yet); zone 2b is accessible to passengers that have been screened and whose hand-luggage has also been screened;

and zones 2c are only accessible to airport personnel, such as security personnel and operators of the system 1, 1a. Access to zones 2c is thus prohibited for passengers. That which is described below with reference to system 1 analogously also applies to system 1a. Like parts are indicated by the same numerals in FIG. 1. A comparable setup with one or more systems 1 may be provided in other types of buildings, for example at businesses or public buildings such as law courts.

The system 1, and thus also the system 1a, is essentially made up of four infeed stations 10, an outfeed station 12, a screening station 14 and a conveyor 16 which extends from the infeed station 10, through the screening station 14, to the outfeed station 12, which conveyor is in the present example made up of a 5 combination of successive roller and belt conveyors. The use of fewer than or more than four infeed stations 10, for example one, two or six or eight or yet another number of infeed stations is also possible within the scope of the invention. The system 1 further comprises a multitude of object containers, in the form of trays 18 in the present example but alternatively also configured as crates, dishes, plates, 10 baskets or the like. Combinations of various types of object containers are likewise possible within the scope of the present invention. The object containers may optionally be in various sizes within the scope of the present invention. In use, the conveyor 16 conveys trays 18 from the infeed station 10, via the screening station 14, to the outfeed station 12. Within the scope of the invention also other objects, for example, but not limited to, suitcases and trolleys of passengers 15 not placed in a tray 18, can be conveyed by means of the conveyor 16 for screening.

The screening station 14 comprises a scanning unit 20 for generating an X-ray image or images of the passenger's object or objects placed in a tray 18 for use in the screening process. Subsequently it can be determined, in an automated process or by an operator, whether an object is (possibly) a prohibited object. Within the scope of the present invention, the term "object" is understood to mean an item belonging to the passenger's hand-luggage, such as a purse, a laptop computer, a coat, etc. A passenger can place an object separately in a tray, or, for example, a number of objects together, for example a bag containing items such as clothing. An object of the screening process is to intercept objects that are prohibited, in an aeroplane in the present example.

FIG. 2 shows the four infeed stations 10 in more detail. FIG. 4 shows a separate infeed station 10 in even more detail. Each infeed station 10 has an identification terminal 22 for determining an identification of the passenger. In the present example, the identification terminal 22 is formed by a scanner which is configured for scanning a boarding pass and/or for scanning an identification document such as a passport. The information obtained by said scanning, i.e. a passenger's identification, can be stored in a memory element of a processing device yet to be described or, alternatively, in an external database connected to the system, for example.

Each one of the multitude of trays 18 has a readable container identification, in the present example in the form of an RFID code 25 (not shown in detail). The system 1 further comprises a reading device in the form of an RFID reader 23 for reading the container identification, and a processing device 26 that is operatively connected to the reading device 23 and the identification terminal 22 for automatically linking the container identification of a tray 18 presented to the passenger to said passenger's identification as determined by means of the scanner 22 at the infeed station 10. The processing device may alternatively also be separately provided at a location remote from the rest of the system. The reading device 23 (see FIG. 4) is provided on the inner side of a compartment 35 yet to be described, at the location of the opening 36 thereof.

The processing device 26 comprises a processor, a memory element, and input means and output means which are operatively connected to the processor. The memory element comprises software which, when loaded into the system by the processor in use, carries out steps as described below using the processing device. The processing device may be electrically connected to a user interface such as a touch display for an operator. The identification terminal 22 and the reading device 23 are operatively connected to the input means of the processing device 26. The processing device may furthermore be operatively connected to a further, external processing device for external storage of data such as passenger identification and container identification as well as information regarding the link between the two.

Each infeed station 10 further comprises an object container dispenser, in the present example a tray dispenser 24, therefore, for making a tray 18, or several trays 18 in succession, available to the passenger present at the infeed station, so that said passenger can place an object in the tray(s) 18. The supply of empty trays 18 takes place via a supply conveyor (not shown in the figures), which extends under said conveyor 16 from the outfeed station 12 or from a buffer for empty trays, or from the outfeed station 12, via a buffer for empty trays, to the infeed station 10.

Figure 6:
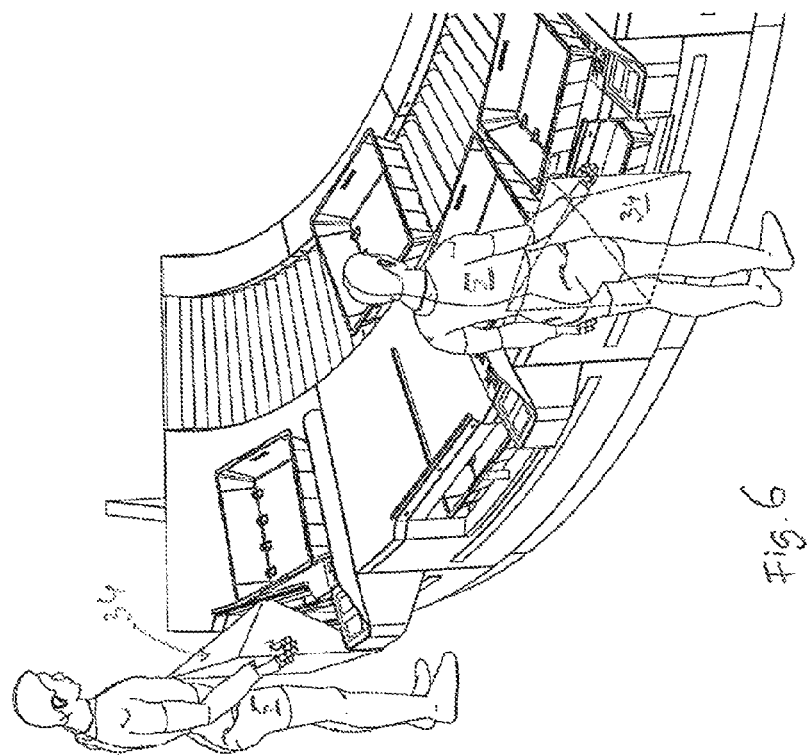
FIGS. 5 and 6 are three-dimensional views of a part of a system shown in FIG. 1.
Figure 5:
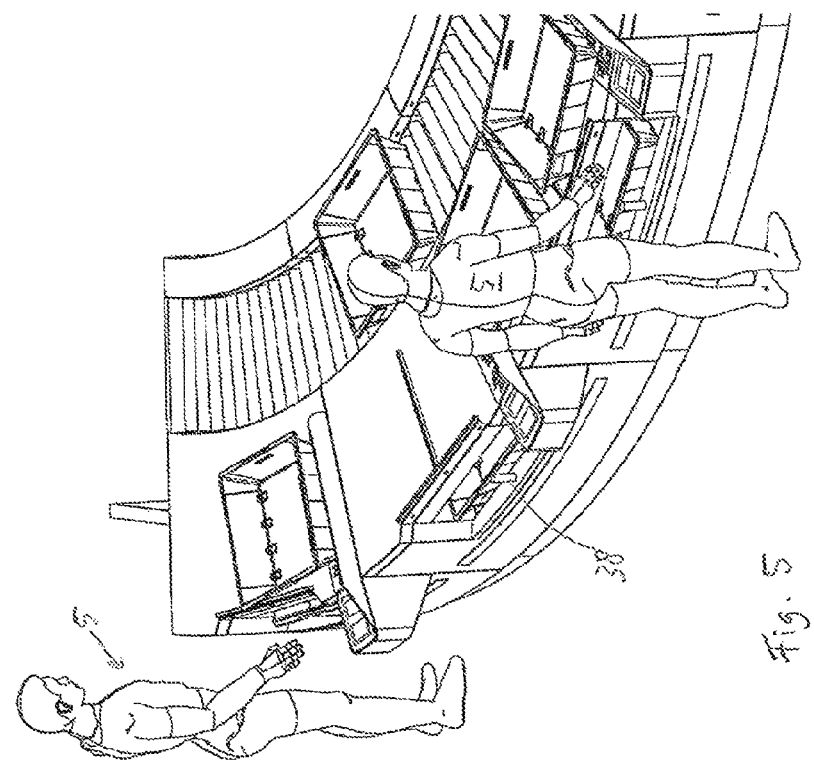

Refer in particular to FIGS. 5 and 6. Each infeed station 10 further comprises a detection device for detecting an individual passenger at the location of the infeed station 10. The detection device is made up of a sensor 32, which is configured for contactless detection of the passenger 5 in a predetermined detection area, indicated at 34 by way of illustration in FIG. 6, at the infeed station 10. In the present example the sensor 32 is a presence sensor, more specifically a photo-electric sensor. The sensor 32 senses (at least substantially) continuously or at short intervals whether a passenger is present and is adjusted so that it can perceive a passenger's departure from the infeed station. The detection device may comprise several such sensors 32 or several sensors of mutually different types for increased reliability. The detection device is electrically operatively connected to the processing device 26 via the input means thereof.

The tray dispenser 24 has an object container location, which is configured as a compartment 35 provided with an opening 36 at the front side, for making a tray 18 available to the passenger 5 at that location. The compartment 35 is accessible to the passenger 5 via the opening 36 at the front side, i.e. the side of the infeed station 10 where the passenger 5 is present, via which the passenger can take a tray 18 from the compartment 35 by hand. The passenger 5 can take a tray 18 from the compartment 35 and place it on one of the two loading positions 21 that are available for each infeed station 10. After the tray 18 has been loaded with one or more objects, the passenger 5 will slide the filled tray 18 onto the conveyor 16 for transportation thereof to the screening station 14. Optionally a further reading device may be provided at each loading position 21 for reading the container identification.

The tray dispenser 24 further has a lock pin 38 which is movable between a locking position and a releasing position, which lock pin forms a blocking device and which, in use, prevents, or in other words, blocks the making available of a tray to the passenger 5 at the object container location 35 in the blocking position thereof and which releases the making available of a tray to the passenger at the object container location 35 in the releasing position thereof in that, in the releasing position, the lock pin 38 is recessed in a frame 39 of the infeed station 10 that surrounds the compartment 35. As shown in the figures, the lock pin 38 is centrally provided in the opening 36 for an associated compartment 35, such that a tray 18 cannot move past the lock pin 28 and through the opening 36 in the locking position. The lock pin 38 further has an actuator (not shown) for electrically moving the lock pin 38 between the blocking position and the releasing position. The blocking device is electrically connected to the processing device 26 via the output means thereof, and is controlled by the processing device 26 in use. The above-mentioned sensor 38 is provided in the immediate vicinity of the opening 36, more specifically directly above the opening 36.

The object container dispenser, in the form of a tray dispenser 24 in the present example, is configured to make trays 18 available to the passenger 5, who is present at the infeed station 10 of which the tray dispenser 24 forms part, in use of the system 1 only when, i.e. after, the identification of said passenger 5 has been determined by means of the identification terminal 22 and as long as the detection device 32 continues to detect the presence of said passenger at the infeed station 10, and that under the control of the processing device 26. During that space of time, the lock pin 38 is in the releasing position, therefore, and an empty tray 18 is automatically placed on the tray location 35 for being made available to the passenger 5 as soon as the preceding tray 18 has been removed by said passenger. Prior to the determination of the identification of the passenger 5 and after the passenger 5 has left the infeed station 10 and the detection means 32 no longer detect the presence of the passenger, therefore, the lock pin 38 will be in the blocking position thereof, so that removing a tray 18 is no longer possible.

After the passenger has filled one or more trays 18 with an object, for example the object 19 shown in FIG. 1, and said trays have been linked to the identification of the passenger 5 under the control of the processing device 26, the trays 18 are carried through the scanning unit 20 by means of the conveyor 16 so as to be screened there for possibly prohibited objects. In the situation in which a prohibited or possibly prohibited object has been recognised by the scanning unit 20 or by an operator on the basis of images made by the scanning unit 20, the tray 18 containing the object in question can for example be directed to a side track 40 on the rear side of the system 1, which is accessible to the operator or another operator but not to the passenger 5. At that location further manual inspection of the object can take place. If scanning by the scanning unit 20 shows that no prohibited or possibly prohibited objects appear to be present in the tray 18, the tray 18 in question 18 is directed to the outfeed station 12, on a part 42 of the conveyor 16 which is accessible to the passenger 5 and which forms the release location of the outfeed station 12.

In a zone 2c, the system 1 further comprises an additional tray dispenser 50 (see FIG. 3) for use by an operator of the system 1. Trays are readily available to the operator, for example in the case that an object that should be present in a tray has landed on the conveyor 16.

What is claimed is:

1. A system for screening objects belonging to individuals including air passengers, comprising an infeed station, a multitude of object containers, an outfeed station, a screening station for automated screening of object containers from the infeed station, a conveyor designed for conveying object containers from the infeed station to the outfeed station via the screening station in use,
    wherein the infeed station comprises an identification terminal for determining an identification of the individual, and an object container dispenser for making an object container available to the individual for placement of an object in the object container,
    wherein the infeed station further comprises a detection device for detecting the individual at the infeed station,
    wherein the object container dispenser is configured to make object containers available to the individual during use of the system only when said individual's identification has been determined using the identification terminal and as long as the detection device continues to detect said individual at the infeed station.

2. A system according to claim 1, wherein the screening station comprises a scanning unit for generating an X-ray image of the individual's object placed in an object container for use in the screening process.

3. A system according to claim 1, wherein each one of the multitude of object containers has a readable container identification and said system is further provided with:
    a reading device for reading the container identification and a processing device that is operatively connected to the reading device and the identification terminal for automatically linking the container identification of an object container made available to the individual to that individual's identification.

4. A system according to claim 1, the system further comprising:
    an object container location wherein the object container dispenser provides the object container at the object container location such that the object container is made available to the individual, and
    a blocking device which is movable between a blocking position and a releasing position, said blocking device, in use, blocks the object container in the blocking position, preventing the object container to be made available to the individual at the object container location in a releasing position.

5. A system according to claim 4, wherein the individual can gain access to the object container location via an opening with one of his hands to take the object container, and wherein the blocking device blocks the opening at least in part to passage of an object container in the blocking position.

6. A system according to claim 4, wherein the blocking device comprises an actuator and a lock pin that is movable by means of the actuator between its blocking position and the releasing position.

7. A system according to claim 1, wherein the detection device comprises a sensor which is configured for contactless detection of the individual in a predetermined detection area at the infeed station.

8. A system according to claim 7, wherein the sensor is a presence sensor, selected from the group consisting of: a photo-electric sensor, a video camera sensor, a capacitive sensor, a passive infrared (PIR) sensor, a microwave sensor and an ultrasonic sensor.

9. A system according to claim 7, wherein the sensor is provided in the immediate vicinity of the opening.

10. A system according to claim 1, wherein the conveyor extends from the infeed station, through the screening station, to the outfeed station, and the conveyor is: a belt conveyor, a ball conveyor or a roller conveyor.

11. A system according to claim 1, wherein the outfeed station comprises a releasing location for releasing object containers arriving from the screening station to the individual.

12. A method for screening comprising the steps of:
a) providing a system for screening objects belonging to individuals including air passengers, comprising:
an infeed station,
a multitude of object containers,
an outfeed station,
a screening station for automatically screening object containers from the infeed station,
a conveyor for conveying object containers from the infeed station to the outfeed station, the conveyor passing through the screening station;
wherein the infeed station comprises an identification terminal, and an object container dispenser for making an object container available to the individual for placement of an object in the object container;
wherein the infeed station further comprises a detection device,
b) determining the individual's identification, using the identification terminal;
c) detecting the individual at the infeed station, using the detection device; and
d) making object containers available to the individual during use of the system only when the individual's identification has been successfully determined using the identification terminal and as long as the detection device continues to detect the individual at the infeed station.

13. A method according to claim 12, wherein the system further comprises:
an object container location wherein the object container dispenser provides the object container at the object container location such that the object container is made available to the individual, and
a blocking device which is movable between a blocking position and a releasing position, said blocking device, in use, blocks the object container in the blocking position, preventing the object container to be made available to the individual at the object container location in a releasing position; and
wherein the blocking device only releases the object container to the individual when the individual's identification has been determined by means of the identification terminal and as long as the detection device continues to detect the individual at the infeed station.

14. A method according to claim 12, wherein each one of the multitude of object containers has a readable container identification, the system further comprising:
a reading device for reading the container identification and
a processing device that is operatively connected to the reading device and the identification terminal for automatically linking the container identification of an object container made available to the individual to that individual's identification; and
wherein the method comprises the additional steps of:
e) reading the container identification of the object container being made available to the individual, using the reading device, and
f) linking said container identification to said individual's identification, using the processing device.

* * * * *